(12) United States Patent
Kuncoro et al.

(10) Patent No.: US 8,423,991 B2
(45) Date of Patent: Apr. 16, 2013

(54) EMBEDDED NETWORK DEVICE AND FIRMWARE UPGRADING METHOD

(75) Inventors: Irawan Kuncoro, Taipei Hsien (TW); Sofian Teja, Taipei Hsien (TW); Shu-Hung Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 322 days.

(21) Appl. No.: 12/869,766

(22) Filed: Aug. 27, 2010

(65) Prior Publication Data
US 2011/0302572 A1 Dec. 8, 2011

(30) Foreign Application Priority Data

Jun. 4, 2010 (CN) .......................... 2010 1 0191690

(51) Int. Cl.
*G06F 9/44* (2006.01)
*G06F 21/00* (2006.01)
(52) U.S. Cl.
USPC ............................................ 717/171; 705/51
(58) Field of Classification Search .................... 717/171
See application file for complete search history.

(56) References Cited

U.S. PATENT DOCUMENTS

| | | | | |
|---|---|---|---|---|
| 5,566,335 | A | * 10/1996 | Nash et al. | 713/1 |
| 6,205,548 | B1 | * 3/2001 | Hasbun | 713/2 |
| 2007/0050675 | A1 | 3/2007 | Yu | |
| 2008/0109798 | A1 | * 5/2008 | Gavens et al. | 717/168 |

* cited by examiner

*Primary Examiner* — Calvin L Hewitt, II
*Assistant Examiner* — Zeshan Qayyum
(74) *Attorney, Agent, or Firm* — Altis Law Group, Inc.

(57) ABSTRACT

An embedded network device includes a memory, a NOR flash, a first part and a second part of old firmware. The NOR flash includes a first image sector which stores the first part of the old firmware, a second image sector which stores the second part of the old firmware, and a third image sector for backup the old firmware. The embedded network device obtains a first part and a second part of new firmware and store the new firmware in the memory, reads the first part of the old firmware from the first image sector and writes to the third image sector, reads the first part of the new firmware form the memory and writes to the first image sector, reads the second part of the new firmware from the memory and writes to the third image sector.

12 Claims, 4 Drawing Sheets

EMBEDDED NETWORK DEVICE AND FIRMWARE UPGRADING METHOD

BACKGROUND

1. Technical Field

Embodiments of the present disclosure relate to embedded network devices, and more particularly to a firmware upgrading method of an embedded network device.

2. Description of Related Art

An embedded network device, such as an ADSL router, may require its firmware to be upgraded, which is an embedded operating system of the embedded network device. The embedded network device cannot boot up if the firmware is damaged. Upgrading the firmware requires flash memory of the embedded network device to be rewritten and firmware to be replaced with a newer version. Thus, the firmware requires to be successfully upgraded and failure is unpermitted. However, many factors, such as cutoff of the power supply to the embedded network device during the firmware upgrading can bring the failure. Therefore, the embedded network device backups the firmware to avoid the firmware damage.

Generally, the firmware is stored in a NOR flash of the embedded network device. Now, price of the NOR flash is very high. For example, a 4 MB nor flash substantially costs 0.6 USD, an 8 MB nor flash substantially costs 1.1 USD, and a 16 MB NOR flash substantially costs 2 USD. Thus, the NOR flash plays an important role in the cost of the embedded network system, especially in large manufactures. For example, the firmware of the embedded network system needs 2.1 MB, and then the backup system of the firmware also needs 2.1 MB. Then, the embedded network system requires including an 8 MB NOR flash, which double the cost. Then, it is very important to decrease the cost on the NOR flash and simultaneously assures the reliability of the firmware upgrading.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
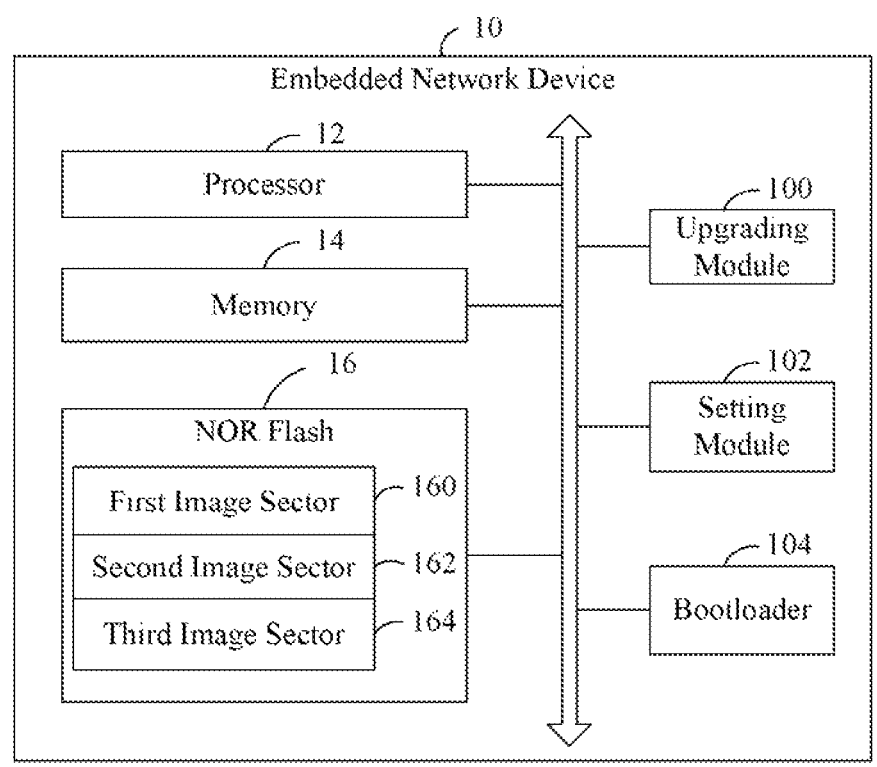
FIG. 1 is a schematic diagram of functional modules of one embodiment of an embedded network device of the present disclosure.

FIG. 1 is a schematic diagram of functional modules of one embodiment of an embedded network device 10 of the present disclosure. The embedded network device 10 includes firmware for booting and operating. In one embodiment, the embedded network device 10 may be, for example, a router, a modem, or a gateway.

In one embodiment, the firmware of the embedded network device 10 at least includes two independent parts. Here, "independent" means upgrading of one part is independent from that of the other part. For example, the firmware of the embedded network device includes two independent parts: one is a kernel system and the other is a root file system. Upgrading of the kernel would not be limited by upgrading of the root file system. That is, the upgraded kernel can be successfully operated with the original root file system.

In one embodiment, the embedded network device 10 includes a processor 12, a memory 14, a NOR flash 16, an upgrading module 100, a setting module 102, and a bootloader 104. The firmware is stored in the memory 14. When the embedded network device 10 boots up, the firmware in the memory 14 is run by the processor 12 to support the embedded network device 10 running normally. In one embodiment, the upgrading module 100, the setting module 102, and the bootloader 104 may include processor-executable programs stored in the NOR flash 16.

The NOR flash 16 includes a first image sector 160, a second image sector 162, and a third image sector 164. The second image sector 162 and the third image sector 164 are alternatively considered as a backup sector for backup the firmware. That is, if the third image sector 164 is considered as the backup sector at a first time of upgrading the firmware, the second image sector 162 is considered as the backup sector at a second time of upgrading the firmware, and then, the third image sector 164 is considered as the backup sector at a third time of upgrading the firmware, and so on. Here, the third image sector 164 is regarded as an example of the backup sector in the following detail description. In one embodiment, the first part of the old firmware is stored in the first image sector 160, and the second part of the old firmware is stored in the second image sector 162.

In one embodiment, the embedded network device 10 uses upgrading information to indicate status of upgrading the firmware. The upgrading information is stored in the NOR flash 16. In one embodiment, the upgrading information includes three fields: a status field, a partition field, and a sector field. The status field indicates whether the firmware upgrading is completed or not completed. If the status field is set as 'finished', the firmware upgrading is complete. If the status field is set as 'upgrading', the firmware upgrading is not complete. The partition field indicates the upgrading part of the firmware. The sector field indicates the image sector being considered as the backup sector, for example, 'the third image sector'.

The upgrading module 100 obtains new firmware of the embedded network device 10 from a technology support network and stores the new firmware in the memory 14 and determines that the sector of the upgrading information is 'the third image sector'. The upgrading module 100 reads the first part of the old firmware of the embedded network device 10 from the first image sector 160 and writes the first part of the old firmware to the current backup sector, namely the third image sector 164.

Subsequently, the upgrading module 100 reads the first part of the new firmware from the memory 14 and writes the first part of the new firmware to the first image sector 160, and reads the second part of the new firmware from the memory 14 and writes the second part of the new firmware to the current backup sector, namely the third image sector 164. Then, the upgrading module 100 points a starting pointer of the first part of the new firmware to the third image sector 164 to make the embedded network device 10 can boot according to the firmware in the first image sector 160 and the current backup sector, namely the third image sector 164, to complete the firmware upgrading.

The setting module 102 sets the status of the upgrading information as 'upgrading' and sets the partition of the upgrading information as 'first part of old firmware' when the upgrading module 100 completes the writing of the first part of the old firmware. The setting module 102 sets the partition of the upgrading information as 'second part of new firmware' when the upgrading module 100 completes the writing of the first part of the new firmware. The setting module 102 sets the status of the upgrading information as 'finished' and sets the sector of the upgrading information as 'the second image sector' when the upgrading module 100 completes the writing of the second part of the new firmware.

It should be noted that setting one of the three fields of the upgrading information as some words like 'finished', 'second part of new firmware', etc, means setting the field as a value to indicate the meaning of the words. For example, the status can be set as 0 to indicate the firmware upgrading is uncompleted, and as 1 to indicate the firmware upgrading is completed.

After the firmware upgrading completes, the embedded network device 10 reboots. As such, the bootloader 104 obtains the upgrading information and determines if the status of the upgrading information is 'finished'. The bootloader 104 boots according to the firmware in the first image sector 160 and one sector which is not the backup sector selected from the second third image sector 162 and the third image sector 164 to make the embedded network device 10 reboots up according to the firmware. That is, if the sector of the upgrading information is 'the third image sector', the bootloader 104 boots according to the firmware in the first image sector 160 and the second image sector 162. If the sector of the upgrading information is 'the second image sector', the bootloader 104 boots according to the firmware in the first image sector 160 and the third image sector 164.

The bootloader 104 determines if the partition of the upgrading information is 'first part of old firmware' when the status of the upgrading information is 'upgrading'. The bootloader 104 boots the embedded network device 10 and makes the upgrading module 100 to upgrade the firmware once again when the partition of the upgrading information is not 'first part of old firmware'.

The bootloader 104 reads the first part of the old firmware from the third image sector 164 and writes the first part of the old firmware to the first image sector 160 when the partition of the upgrading information is 'first part of old firmware'. Then, the bootloader 104 sets the status of the upgrading information as 'finished' and boots according to the firmware stored in the first image sector 160 and the second image sector 162. After that, the bootloader 104 notifies the upgrading module 100 and the setting module 102 to re-upgrade the firmware of the embedded network device 10.

When the firmware of the embedded network device 10 is required to be upgraded, the processor 12 executes the upgrading module 100 and the setting module 102 stored in the memory 14 to upgrade the old firmware stored in the NOR flash 16 to the new firmware stored in the memory 14. The upgrading module 100 and the setting module 102 make sure that the embedded network device 10 can boot up successfully even when the firmware is damaged while the firmware upgrading by way of the backup sector. The backup sector is just required to store one part of the new firmware which contains more data, not the whole new firmware. Therefore, the embedded network device 10 of the present disclosure can decrease the cost on the NOR flash 16 and simultaneously assures the reliability of the firmware upgrading.

In addition, the setting module 102 sets the sector as 'the second image sector' when the firmware upgrading is completed to consider the second image sector to alternatively consider the second image sector 162 and the third image sector 164 as the backup sector. Thus, the embedded network device 10 of the present disclosure does not requires to read the second part of the old firmware from the second image sector 162 and write to the third image sector, which simplifies process of the firmware backup and decreases time cost on the firmware upgrading.

Figure 2:
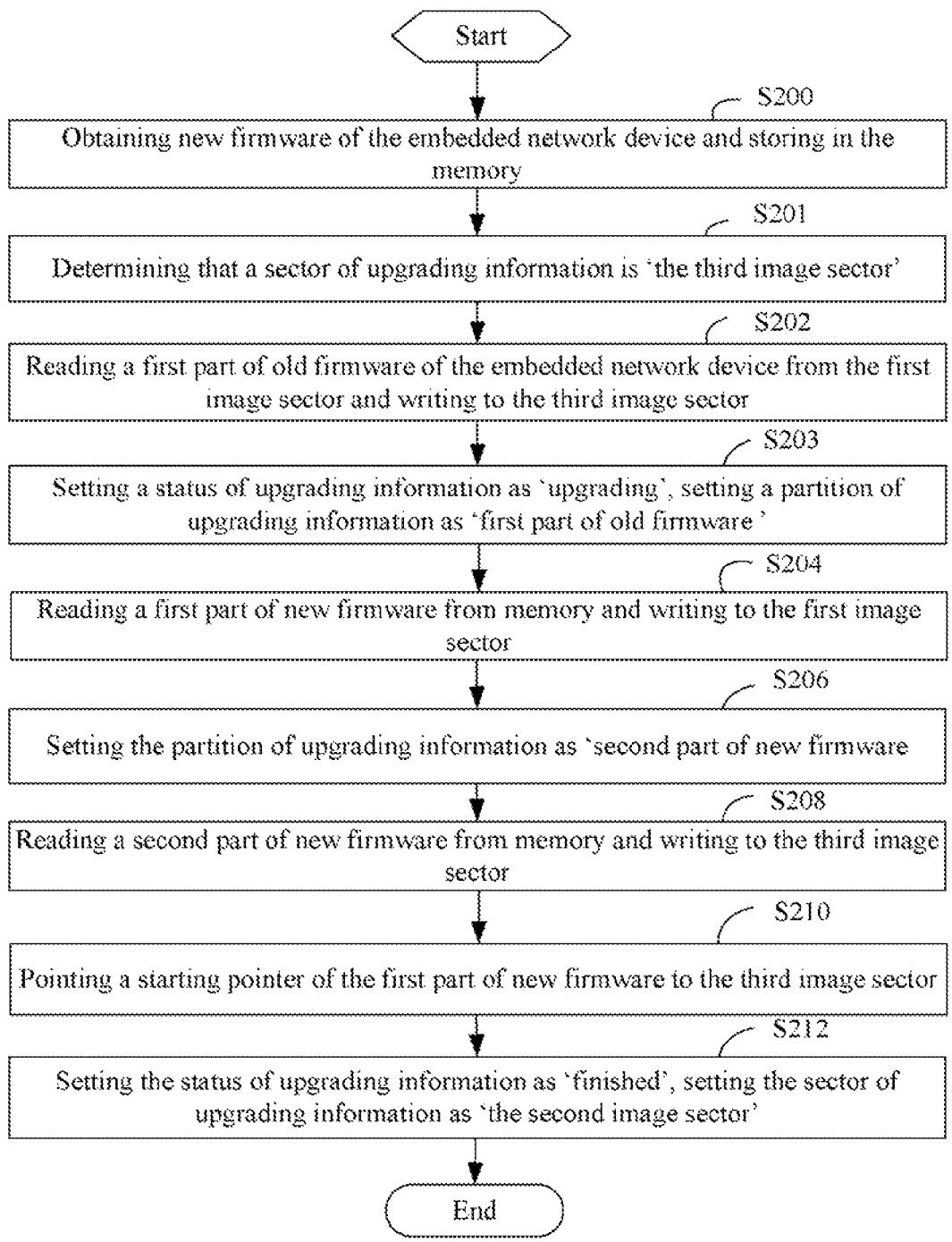
FIG. 2 is a flowchart of a firmware upgrading method of one embodiment of the present disclosure.

FIG. 2 is a flowchart of a firmware upgrading method of one embodiment of the present disclosure. The flowchart is executed by the upgrading module 100 and the setting module 102 of FIG. 1. Depending on the embodiment, additional blocks may be added, others deleted, and the ordering of blocks may be changed while remaining well within the scope of the disclosure. Here, the first part of the old firmware of the embedded network device 10 is stored in the first image sector 160. The second part of the old firmware of the embedded network device 10 is stored in the second image sector 162.

In block S200, the upgrading module 100 obtains new firmware of the embedded network device 10 and stores the new firmware in the memory 14. In block S201, the upgrading module 100 determines that the sector of the upgrading information is 'the third image sector'.

In block S202, the upgrading module 100 reads the first part of the old firmware of the embedded network device 10 from the first image sector 160 and writes the first part of the old firmware to the current backup sector, namely the third image sector 164. When the upgrading module 100 completes the writing of the first part of the old firmware, the third image sector 164 stores the first part of the old firmware of the embedded network device 10. After that, in block S203, the setting module 102 sets the status of the upgrading information as 'upgrading' and sets the partition of the upgrading information as 'first part of old firmware'.

In block S204, the upgrading module 100 reads the first part of the new firmware from the memory 14 and writes the first part of the new firmware to the first image sector 160. When the upgrading module 100 completes the writing of the first part of the new firmware, the first image sector 160 stores the first part of the new firmware of the embedded network device 10. After that, in block S206, the setting module 102 sets the partition of the upgrading information as 'second part of new firmware'.

In block S208, the upgrading module 100 reads the second part of the new firmware from the memory 14 and writes the second part of the new firmware to the current backup sector, namely the third image sector 164. When the upgrading module 100 completes the writing of the second part of the new firmware, the third image sector 164 stores the second part of the new firmware. Then, in block S210, the upgrading module 100 points the starting pointer of the first part of the new firmware to the third image sector 164 to make the embedded network device 10 can boot according to the firmware in the first image sector 160 and the current backup sector, namely the third image sector 164, to complete the firmware upgrading. After that, in block S212, the setting module 102 sets the status of the upgrading information as 'finished' and sets the sector of the upgrading information as 'the second image sector'.

When the firmware upgrading is completed successfully, the first image sector 160 stores the first part of the new firmware of the embedded network device 10, the second image sector 162 stores the second part of the old firmware of the embedded network device 10, and the third image sector 164 stores the second part of the new firmware of the embedded network device 10. The status of the upgrading information is 'finished', the partition of the upgrading information is 'second part of new firmware', and the sector of the upgrading information is 'the second image sector'. As such, the embedded network device 10 boots according to the new firmware in the first image sector 160 and the third image sector 164.

Figure 3:
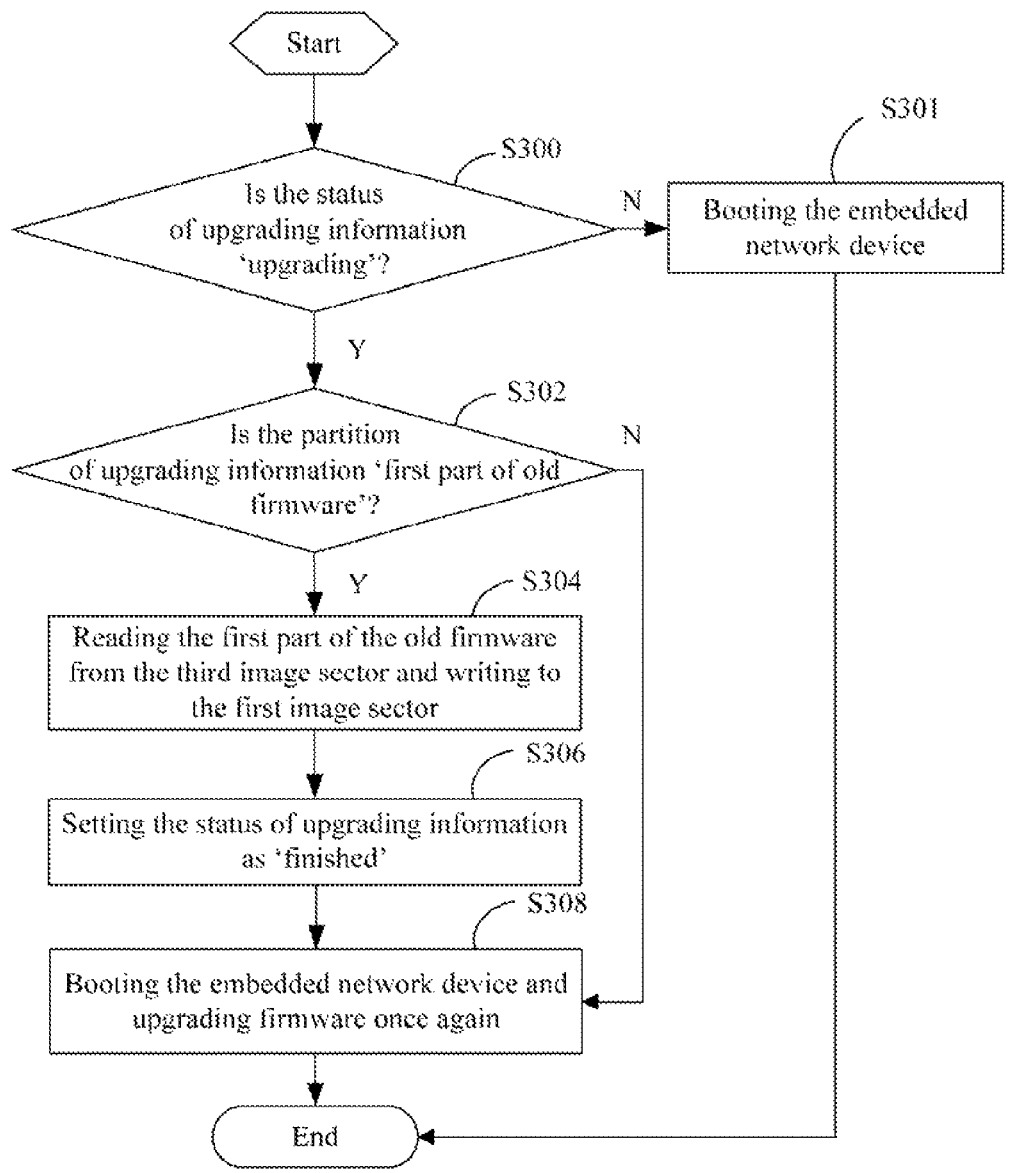
FIG. 3 is a flowchart of the embedded network device of FIG. 1 rebooting according to the upgraded firmware according to the firmware upgrading method of FIG. 2.

FIG. 3 is a flowchart of the embedded network device 10 of FIG. 1 rebooting according to the upgraded firmware according to the firmware upgrading method of FIG. 2. The flowchart is executed by the bootloader 104 of FIG. 1. Depending on the embodiment, additional blocks may be added, others deleted, and the ordering of blocks may be changed while remaining well within the scope of the disclosure.

In block S300, the bootloader 104 obtains the upgrading information and determines if the status of the upgrading information is 'finished'. If the status of the upgrading information is 'finished', then in block S301, the bootloader 104 boots according to the firmware to make the embedded network device 10 reboots up. In one embodiment, the status of the upgrading information being 'finished' indicates two conditions. One is successfully upgrading, and the other is in failure which happens on block S202.

In detail, when 'finished' indicates successfully upgrading, then the bootloader 104 boots according to the first part of the new firmware in the first image sector 160 and the second part of the new firmware in the third image sector 164 to make the embedded network device 10 reboots up.

When 'finished' indicates failure which happens on block S202, namely failure on the reading or writing of the first part of the old firmware, then the bootloader 104 boots according to the first part of the old firmware in the first image sector 160 and the second part of the old firmware in the second image sector 162 to make the embedded network device 10 reboots up. Then, the embedded network device 10 requires re-upgrading the firmware after booting up.

If the status of the upgrading information is 'upgrading', namely the firmware upgrading is failure, then in block S302, the bootloader 104 determines if the partition of the upgrading information is 'first part of old firmware' to determine on which block the failure happens.

If the partition of the upgrading information is 'first part of old firmware', then the failure happens on block S204 of the reading or writing of the first part of the new firmware. In block S304, the bootloader 104 reads the first part of the old firmware from the third image sector 164 and writes the first part of the old firmware to the first image sector 160. In block S306, the bootloader 104 sets the status of the upgrading information as 'finished'.

As such, the first image sector 160 stores the first part of the old firmware and the second image sector 162 stores the second part of the old firmware. Then in block S308, the bootloader 104 boots according to the firmware stored in the first image sector 160 and the second image sector 162 to make the embedded network device 10 to boot up, and notifies the upgrading module 100 and the setting module 102 to re-upgrade the firmware, namely executing the flowchart of FIG. 2.

If the partition of the upgrading information is 'second part of new firmware', then the failure happens on block S208 of the reading or writing of the second part of the new firmware. As such, the first image sector 160 stores the first part of the new firmware and the second image sector 162 stores the second part of the old firmware. Then in block S308, the bootloader 104 boots according to the firmware stored in the first image sector 160 and the second image sector 162 to make the embedded network device 10 to boot up, and notifies the upgrading module 100 and the setting module 102 to re-upgrade the firmware, namely executing the flowchart of FIG. 2.

Therefore, whichever block the failure is on, the embedded network device 10 can successfully boot up by way of the third image sector 164.

Figure 4:
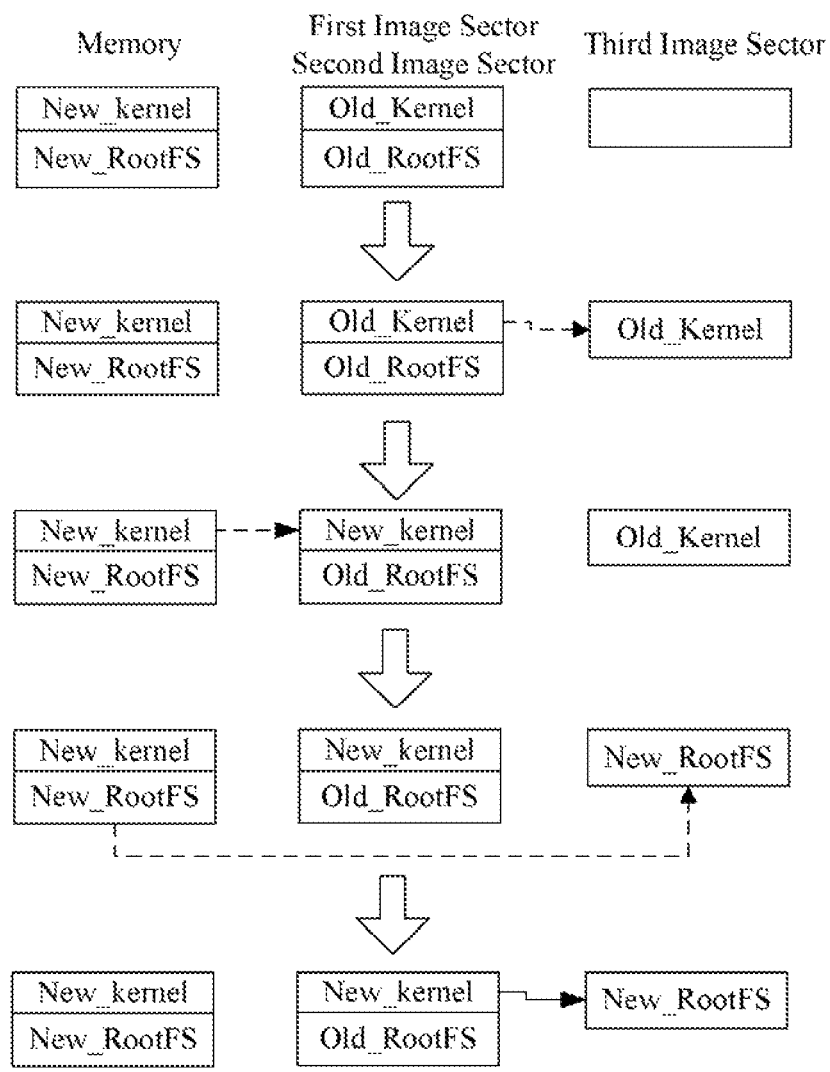
FIG. 4 is a schematic diagram of the embedded network device of FIG. 1 upgrading firmware according to the firmware upgrading method of FIG. 2.

To make the firmware upgrading method more clear, here an example is detailed described in FIG. 4. FIG. 4 is a schematic diagram of the embedded network device 10 of FIG. 1 upgrading firmware according to the firmware upgrading method of FIG. 2. In one embodiment, the firmware of the embedded network device 10 is LINUX system and includes two independent parts, a kernel and a root file system.

Firstly, the upgrading module 100 stores a new kernel and a new file system in the memory 14. Here, an old kernel is stored in the first image sector 160 and an old root file system is stored in the second image sector 162. The third image sector 164 is considered as the backup sector.

Secondly, the upgrading module 100 reads the old kernel in the first image sector 160 and writes the old kernel to the third image sector 164. Here, if the firmware upgrading is in failure, the bootloader 104 boots according to the old kernel and the old root file system.

Next, the upgrading module 100 reads the new kernel in the memory 14 and writes the new kernel to the first image sector 160. Here, if the firmware upgrading is in failure, the bootloader 104 recovers the old kernel from the third image sector 164 to the first image sector 160, and then boots according to the old kernel and the old root file system.

Next, the upgrading module 100 reads the new root file system in the memory 14 and writes the new root file system to the third image sector 164. Here, if the firmware upgrading is in failure, the bootloader 104 boots according to the new kernel and the old root file system.

Next, the upgrading module 100 points a starting pointer of the LINUX system to the third image sector 164 to make the LINUX system can boot according to the new root file system in the third image sector 164 after booting according to the new kernel in the first image sector 160. Here, the firmware upgrading is completed successfully. When the embedded network device 10 reboots up, the bootloader 104 boots according to the new kernel and the new root file system.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An embedded network device, comprising:
a processor;
a memory;
a NOR flash, comprising a first image sector and a second image sector respectively storing a first part and a second part of old firmware of the embedded network device, and a third image sector, the NOR flash storing computerized code that when executed by the processor causes the processor to execute a method comprising:
obtaining a first part and a second part of new firmware of the embedded network device and storing the new firmware in the memory, reading the first part of the old firmware from the first image sector and writing the first part of the old firmware to the third image sector, reading the first part of the new firmware from the memory and writing the first part of the new firmware to the first image sector, reading the second part of the new firmware from the memory and writing the second part of the new firmware to the third image sector, and pointing a starting point of the first part of the new firmware to the third image sector;

booting the embedded network device according to the first part of the new firmware and the starting point.

2. The embedded network device as claimed in claim 1, wherein the method further comprises: setting upgrading information of the embedded network device which comprises a status field, a partition field, and a sector field;

setting the status of the upgrading information as 'upgrading' and setting the partition field of the upgrading information as 'first part of old firmware' in response to completing the writing of the first part of the old firmware, setting the partition field of the upgrading information as 'second part of new firmware' in response to completing the writing of the first part of the new firmware.

3. The embedded network device as claimed in claim 2, wherein the method further comprises setting the status field of the upgrading information as 'finished' and sets the sector field of the upgrading information as 'the second image sector' in response to completing the writing of the second part of the new firmware.

4. The embedded network device as claimed in claim 3, wherein the method further comprises obtaining the upgrading information, and booting according to the firmware in the first image sector and the second image sector upon the condition that the status field of the upgrading information is 'finished' and the sector field of the upgrading information is 'the third image sector', or booting according to the firmware in the first image sector and the third image sector upon the condition that the status field of the upgrading information is 'finished' and the sector field of the upgrading information is 'the second image sector'.

5. The embedded network device as claimed in claim 4, wherein determining in response to the partition field of the upgrading information being 'first part of old firmware' in response to the status field of the upgrading information being 'upgrading', and booting according to the firmware in the first image sector and the second image sector, and upgrading the firmware once again upon the condition that the partition field of the upgrading information is not 'first part of old firmware'.

6. The embedded network device as claimed in claim 3, wherein the method further comprises reading the first part of the old firmware from the third image sector and writing the first part of the old firmware to the first image sector, setting the status field of the upgrading information as 'finished', and booting according to the firmware in the first image sector and the second image sector and upgrading the firmware once again upon the condition that the partition field of the upgrading information is 'first part of old firmware'.

7. A firmware upgrading method of an embedded network device, the embedded network device comprising a memory, a NOR flash, a first part and a second part of old firmware of the embedded network device, the NOR flash comprising a first image sector which stores the first part of the old firmware, a second image sector which stores the second part of the old firmware, and a third image sector, the method comprising:

obtaining, by a processor of the embedded network device, a first part and a second part of new firmware of the embedded network device and storing the new firmware in the memory;

reading, by the processor, the first part of the old firmware from the first image sector and writing the first part of the old firmware to the third image sector;

reading, by the processor, the first part of the new firmware from the memory and writing the first part of the new firmware to the first image sector;

reading, by the processor, the second part of the new firmware from the memory and writing the second part of the new firmware to the third image sector; and pointing, by the processor, a starting point of the first part of the new firmware to the third image sector;

booting, by the processor, the embedded network device according to the first part of the new firmware and the starting point.

8. The firmware upgrading method as claimed in claim 7, further comprising setting, by the processor, upgrading information of the embedded network device which comprises a status field, a partition field, and a sector field wherein setting the upgrading information comprises:

setting the status field of the upgrading information as 'upgrading' and setting the partition field of the upgrading information as 'first part of old firmware' in response to the writing of the first part of the old firmware being completed;

setting the partition field of the upgrading information as 'second part of new firmware' in response to the writing of the first part of the new firmware being completed.

9. The firmware upgrading method as claimed in claim 8, wherein setting the upgrading information further comprises: setting the status field of the upgrading information as 'finished' and setting the sector field of the upgrading information as 'the second image sector' in response to the writing of the second part of the new firmware being completed.

10. The firmware upgrading method as claimed in claim 9, further comprising:

obtaining the upgrading information;

determining whether the status field of the upgrading information is 'finished';

determining whether the upgrading information is 'the third image sector' in response to the status field of the upgrading information is 'finished';

booting according to the firmware in the first image sector and the second image sector in response to the sector field of the upgrading information being 'the third image sector'; or booting according to the firmware in the first image sector and the third image sector in response to the sector field of the upgrading information being 'the second image sector'.

11. The firmware upgrading method as claimed in claim 10, further comprising:

determining whether the partition field of the upgrading information is 'first part of old firmware' whether the status field of the upgrading information is 'upgrading'; and booting according to the firmware in the first image sector and the second image sector and upgrading the firmware once again in response to the partition field of the upgrading information being not 'first part of old firmware'.

12. The firmware upgrading method as claimed in claim 9, further comprising:

reading the first part of the old firmware from the third image sector and writing the first part of the old firmware to the first image sector in response to the partition field of the upgrading information being 'first part of old firmware';

setting the status field of the upgrading information as 'finished'; and booting according to the firmware in the first image sector and the second image sector and upgrading the firmware once again.

\* \* \* \* \*